(12) United States Patent
Tomoda et al.

(10) Patent No.: US 9,369,598 B2
(45) Date of Patent: Jun. 14, 2016

(54) READING APPARATUS WITH COMPACT DRIVE UNIT ASSEMBLY

(71) Applicant: Canon Kabushiki Kaisha, Tokyo (JP)

(72) Inventors: Akihiro Tomoda, Yokohama (JP); Masahiro Kawanishi, Yokohama (JP); Takashi Awai, Chiba (JP); Tadashi Hanabusa, Yokohama (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/751,419

(22) Filed: Jan. 28, 2013

(65) Prior Publication Data

US 2013/0194599 A1 Aug. 1, 2013

(30) Foreign Application Priority Data

Jan. 31, 2012 (JP) ................................. 2012-018919

(51) Int. Cl.
| | |
|---|---|
| *H04N 1/00* | (2006.01) |
| *H04N 1/047* | (2006.01) |
| *H04N 1/04* | (2006.01) |
| *H04N 1/12* | (2006.01) |
| *H04N 1/193* | (2006.01) |

(52) U.S. Cl.
CPC ....... *H04N 1/00522* (2013.01); *H04N 1/00525* (2013.01); *H04N 1/00551* (2013.01); *H04N 1/0473* (2013.01); *H04N 1/121* (2013.01); *H04N 1/193* (2013.01); *H04N 2201/0081* (2013.01); *H04N 2201/0471* (2013.01)
USPC .............. 358/1.6; 358/1.1; 358/474; 358/505

(58) Field of Classification Search
CPC ........................ H04N 1/00551; H04N 1/00554
USPC ......... 358/474, 498, 1.1, 1.9, 1.13, 1.15, 400, 358/496; 340/545.6; 271/264, 18.1; 399/367, 380
See application file for complete search history.

(56) References Cited

U.S. PATENT DOCUMENTS

| | | | |
|---|---|---|---|
| 5,576,823 A * | 11/1996 | Kakuta et al. | 399/367 |
| 5,842,101 A | 11/1998 | Harada | |
| 5,954,326 A * | 9/1999 | Gaarder et al. | 271/9.02 |
| 7,536,148 B2 * | 5/2009 | Fukumura | 399/367 |

(Continued)

FOREIGN PATENT DOCUMENTS

| | | |
|---|---|---|
| CN | 1138710 A | 12/1996 |
| CN | 1149028 A | 5/1997 |

(Continued)

*Primary Examiner* — Dov Popovici
(74) *Attorney, Agent, or Firm* — Canon U.S.A., Inc., IP Division (57) ABSTRACT

A reading apparatus includes an auto document feeder configured to be openable and closable around a hinge with respect to a unit including an image sensor. The auto document feeder includes a roller configured to move a document relative to the image sensor, a motor, a gear train configured to transmit a rotation of a rotational shaft of the motor to the roller, and an encoder unit configured to detect rotation information of the motor, and including a sensor and a code wheel. An orientation of the rotational shaft is substantially parallel to a rotational axis of the hinge, and the gear train is arrayed in a direction of an extension of the rotational shaft. A gear that is a part of the gear train is attached to one end of the rotational shaft, and the code wheel is attached to the other end thereof.

11 Claims, 6 Drawing Sheets

(56) References Cited

U.S. PATENT DOCUMENTS

| | | | |
|---|---|---|---|
| 8,428,476 B2* | 4/2013 | Matsuda et al. | 399/36 |
| 8,605,342 B2* | 12/2013 | Akimatsu | 358/498 |
| 8,724,186 B2* | 5/2014 | Shibata | 358/474 |
| 2004/0052544 A1* | 3/2004 | Hsu et al. | 399/81 |
| 2005/0110205 A1* | 5/2005 | Lee et al. | 271/4.01 |
| 2006/0098242 A1* | 5/2006 | Chang | 358/474 |
| 2007/0177226 A1* | 8/2007 | Ishida et al. | 358/474 |
| 2010/0102500 A1 | 4/2010 | Ito | |
| 2012/0050826 A1* | 3/2012 | Iwata et al. | 358/498 |
| 2013/0003141 A1* | 1/2013 | Kawasaki et al. | 358/474 |
| 2013/0063750 A1* | 3/2013 | Osakabe et al. | 358/1.13 |
| 2013/0063751 A1* | 3/2013 | Miura et al. | 358/1.13 |
| 2013/0194600 A1* | 8/2013 | Kawanishi et al. | 358/1.13 |

FOREIGN PATENT DOCUMENTS

| | | |
|---|---|---|
| CN | 2567919 Y | 8/2003 |
| CN | 1573582 A | 2/2005 |
| CN | 1625212 A | 6/2005 |
| CN | 101031017 A | 9/2007 |
| CN | 101131553 A | 2/2008 |
| CN | 101459754 A | 6/2009 |
| CN | 101472033 A | 7/2009 |
| CN | 102040110 A | 5/2011 |
| JP | S61-292135 A | 12/1986 |
| JP | H06-064849 A | 3/1994 |
| JP | 2627044 B2 | 7/1997 |
| JP | 2007-036620 A | 2/2007 |
| JP | 04089644 B2 | 5/2008 |

\* cited by examiner

READING APPARATUS WITH COMPACT DRIVE UNIT ASSEMBLY

BACKGROUND OF THE INVENTION

1. Field of the Invention

The present disclosure relates to a reading apparatus capable of reading an image of a document.

2. Description of the Related Art

A reading apparatus that reads an image of a document while allowing the document and an image sensor to make a relative movement is known. One type is a flatbed type scanner (abbreviated as an FBS in the specification) that performs scanning and reading while moving an image sensor (a line sensor) relative to the document fixed on a document positioning plate. Another type is a sheet-through type scanner that performs scanning and reading while moving a document relative to a fixed image sensor (a line sensor). A unit that separates and moves documents one by one is referred to as an auto document feeder (abbreviated as an ADF in the specification).

Japanese Patent No. 2627044 discusses a reading apparatus having a combination of these types. The apparatus discussed in Japanese Patent No. 2627044 uses a direct current (DC) motor as a driving source for a sheet movement by an ADF, and has a code wheel (a spinning disk) of an encoder for detecting a motor rotation state attached to a rotational shaft of the motor.

In the ADF of the apparatus discussed in Japanese Patent No. 2627044, a transmission mechanism including gears, a drive shaft, a pulley, an endless belt, and a clutch transmits an output from a DC motor to a roller group that conveys documents. The DC motor is arranged apart at the back side of the apparatus across the transmission mechanism. Consequently, both sides of the DC motor form a large dead space, and the area of the apparatus in a depth direction is uselessly large.

Further, in the ADF of the apparatus discussed in Japanese Patent No. 2627044, a worm gear and a code wheel of the encoder are attached adjacent to each other to a rotational shaft of the DC motor. Since the rotational shaft needs to be made longer, positional deviation of the code wheel is amplified even when the rotational shaft has a slight inclination or bend. Thus, the positional deviation leads to deterioration of detection accuracy of the encoder. In addition, grease used for lubrication of the worm gear is likely to adhere to the adjacent code wheel or an encoder sensor, so that the soiling leads to deterioration of detection accuracy of the encoder.

SUMMARY OF THE INVENTION

The present disclosure is directed to a reading apparatus capable of realizing compatibility between reduction in size of a reading apparatus and document reading with a high accuracy.

According to an aspect described and disclosed herein, a reading apparatus includes a unit including an image sensor for reading a document, and an auto document feeder configured to be openable and closable around a hinge with respect to the unit, wherein the auto document feeder includes a roller configured to move the document relative to the image sensor, a motor, a gear train configured to transmit a rotation of a rotational shaft of the motor to the roller, and an encoder unit configured to detect rotation information of the motor, and including a sensor and a code wheel, wherein an orientation of the rotational shaft is parallel to a rotational axis of the hinge, and the gear train is arrayed in a direction of an extension of the rotational shaft, and wherein a gear that is a part of the gear train is attached to one end of the rotational shaft, and the code wheel is attached to the other end of the rotational shaft.

According to an exemplary embodiment of the present invention, an orientation of a rotational shaft of a motor is substantially parallel with a rotational axis of a hinge of an auto document feeder, and a gear train is arrayed in a direction of an extension of the rotational shaft, and, as a result, reduction in size of the apparatus is realized. In addition, a gear and a code wheel are attached separately at respective end portions of the rotational shaft of the motor, and, as a result, high detection accuracy of an encoder can be maintained for a long period of time. In this way, according to the exemplary embodiment of the present invention, compatibility between reduction in size of the reading apparatus and document reading with a high accuracy can be realized.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the disclosure will be described in detail below with reference to the drawings.

The exemplary embodiment of the present disclosure can be applied to a reading apparatus, which includes an auto document feeder, capable of reading a document by an image sensor. The reading apparatus in the specification refers to not only an apparatus with a single function having only a reading function, but also a multifunctional apparatus that combines the reading function with a printing function and other functions.

Figure 1A:
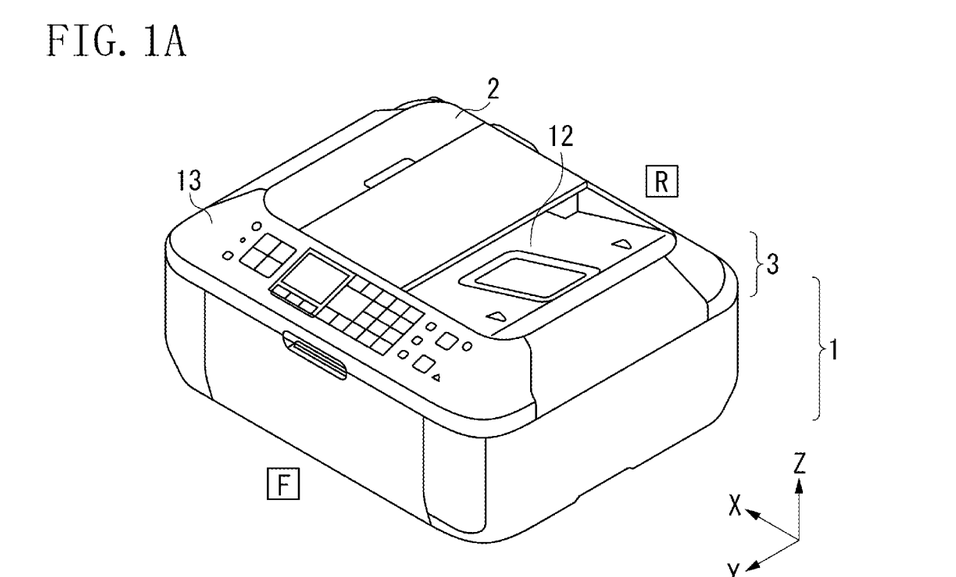
FIGS. 1A and 1B are perspective views illustrating outer appearances of a reading apparatus according to an exemplary embodiment.
Figure 1B:
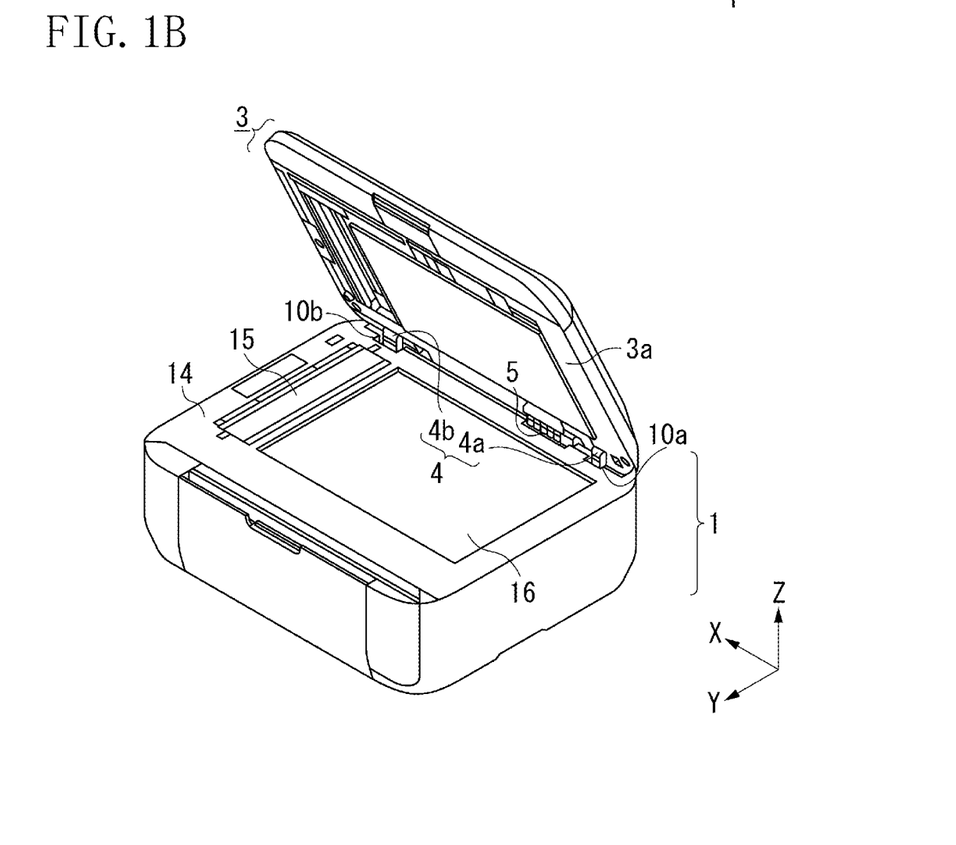
Figure 3:
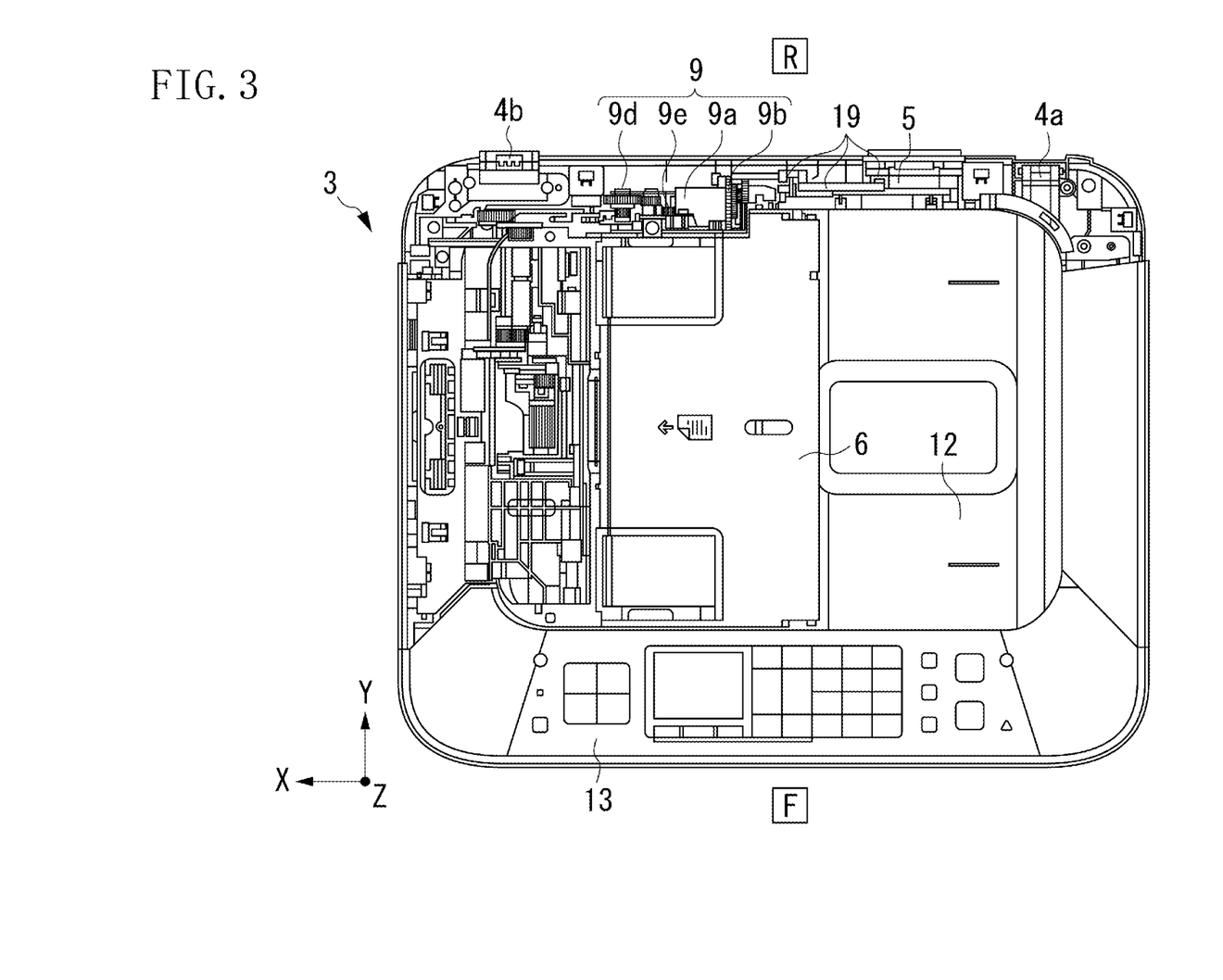
FIG. 3 is a top plan view (partially illustrating an internal structure) of the reading apparatus.

FIGS. 1A and 1B are perspective views illustrating outer appearances of a reading apparatus 1 according to an exemplary embodiment disclosed herein. FIG. 3 is a top plan view when the reading apparatus 1 is seen from above, and partially illustrates an internal structure while an exterior cover is removed. The reading apparatus 1 includes a document positioning plate unit 14 including an image sensor for reading a document, and an auto document feeder (ADF) 3 openable and closable around a hinge portion 4 with respect to the document positioning plate unit 14. FIG. 1A illustrates a state where the ADF 3 is closed with respect to the document positioning plate 14, and FIG. 1B illustrates a state where the ADF 3 is opened. Below the document positioning plate unit 14, a flatbed scanner (FBS), and a printing unit capable of printing an image of the read document are provided. The reading apparatus 1 according to the present exemplary embodiment can perform document reading by a sheet-through using the ADF, or the FBS.

The ADF 3 includes an operation panel 13 serving as a user interface on which indicators and an input portion are arrayed, on a top surface on the front side (the front side indicated by a symbol F in FIG. 1A, and an end portion side opposite the hinge 4 described below) of the reading apparatus 1.

The essential components of the ADF 3 include a feeding unit 2 for moving and scanning document sheets one by one to a reading position of a scanner to be discharged. On a base 3a serving as a housing of the ADF 3, provided are the feeding unit 2 and a discharge tray 12.

The ADF 3 is attached to the document positioning plate unit 14 in a freely openable and closable manner, around the hinge portion 4 including a hinge 4a and a hinge 4b provided at two locations along the side of a rear side (a rear side indicated by a symbol R in FIG. 1A) of the document positioning plate unit 14 of the reading apparatus 1. The user performs an open or close operation by hand at the front side (the front side indicated by a symbol F in FIG. 1A) of the reading apparatus 1.

Two of the hinge 4a and hinge 4b each have rotational axes and damper mechanisms, and directions of the two rotational axes are the same (that is, the X direction). The hinge 4a and hinge 4b each are configured such that one end of hinge components is fixed to the base 3a, and the other end of hinge components is fixed to the document positioning plate unit 14. More specifically, the other end of components of the hinges 4a and 4b are respectively inserted, in a vertically slidable manner, and fixed into concave portions 10a and 10b formed on a base 10 serving as a housing of the FBS. This enables the reading apparatus 1 to surely hold even a thick book document.

Between the hinge 4a and hinge 4b, a hole 5 for passing electric cables therethrough is provided on the base 3a of the ADF 3 and a top surface of the document positioning plate 14. Electric cables 19 including, for example, a flexible flat cable (FFC) connected to electric components, such as the motor built into the feeding unit 2 of the ADF 3 and the encoder sensor, are wired via the hole 5 to be connected to a main substrate (a control unit) provided inside the document positioning plate 14. In this way, since the electric cables 19 are wired without passing the side of a gear train 9d and connected to the control unit, the cables 19 does not touch the gears 9d even if positions of electric cables are deviated due to shock or vibration.

As illustrated in FIG. 1B, on the top surface of the document positioning plate 14, there is formed an elongate reading window 15 made of a glass plate for reading the document by sheet-through using the ADF. Next to this, there is formed a reading surface 16 including a glass plate for placing thereon the document to be read by the FBS. On the reading surface 16, a user places a sheet document or book document. The reading window 15 and the reading surface 16 may be configured by a glass plate. Opposite the reading window 15 on the lower side, a line sensor located at its home position is provided. The line sensor includes a contact image sensor (CIS), and is a sensor unit including a lot of linearly arrayed light-receiving elements and lens arrays of cylindrical lenses.

Figure 2:
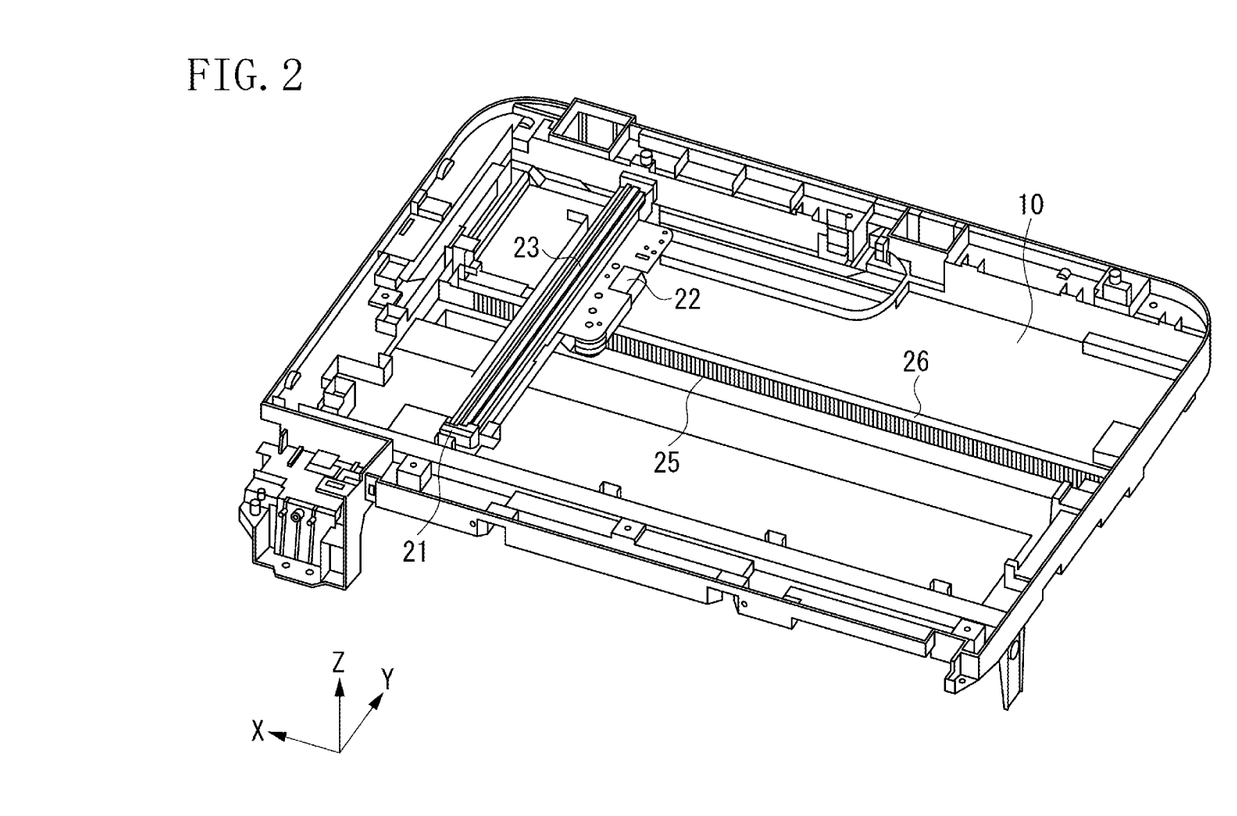
FIG. 2 is a perspective view illustrating a structure of an FBS.

FIG. 2 is a perspective view illustrating a structure of a flatbed scanner (FBS) unit provided below the glass plate of the reading surface 16. A line sensor unit 23 is mounted on a carriage 21, and one-dimensionally moves in the X direction. On the carriage 21, a motor 22 and a gear train serving as a driving source for moving the carriage 21 are further mounted. On the base 10 serving as a housing of the FBS, rack gears 25 and a guide rail 26 are fixed in the same orientation. When the motor 22 rotates, pinion gears engaged with the rack gears 25 rotate, so that the carriage 21 moves along the guide rail 26. Farther below the FBS, a printing unit that performs printing on sheets by an inkjet method is provided.

When document reading is performed by the FBS, the user opens the ADF 3, places a sheet document or a book document on the reading surface 16, and subsequently closes the ADF 3 to fix the document. Next, while the carriage 21 moves the line sensor unit 23, the line sensor unit 23 scans and reads the document.

When document reading is performed by sheet-through, sheet documents are fed one by one by the feeding unit 2 of the ADF to be read by the line sensor unit 23 that rests at its home position while passing over the reading window 15.

Figure 4:
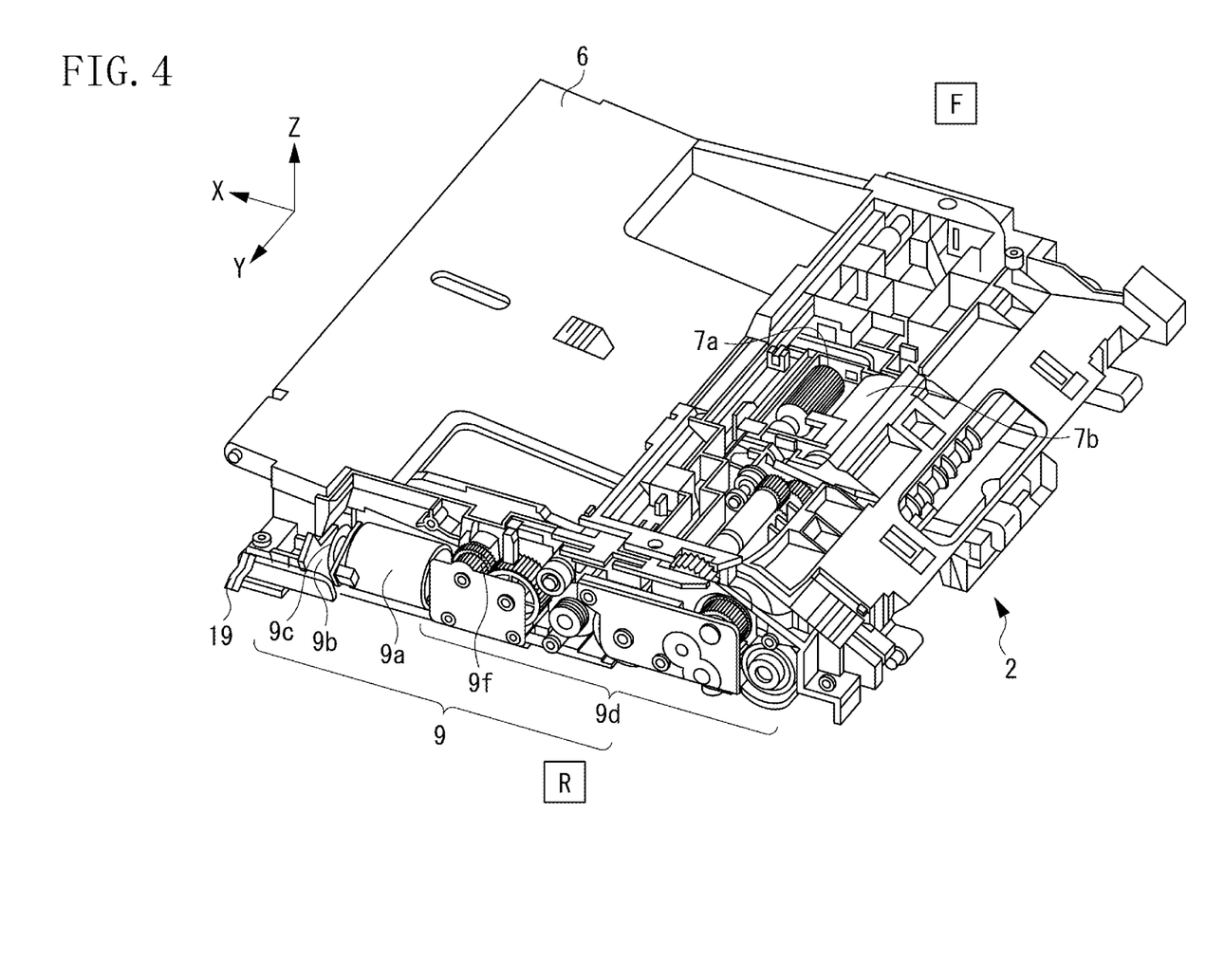
FIG. 4 is a perspective view illustrating a structure of an ADF.
Figure 5:
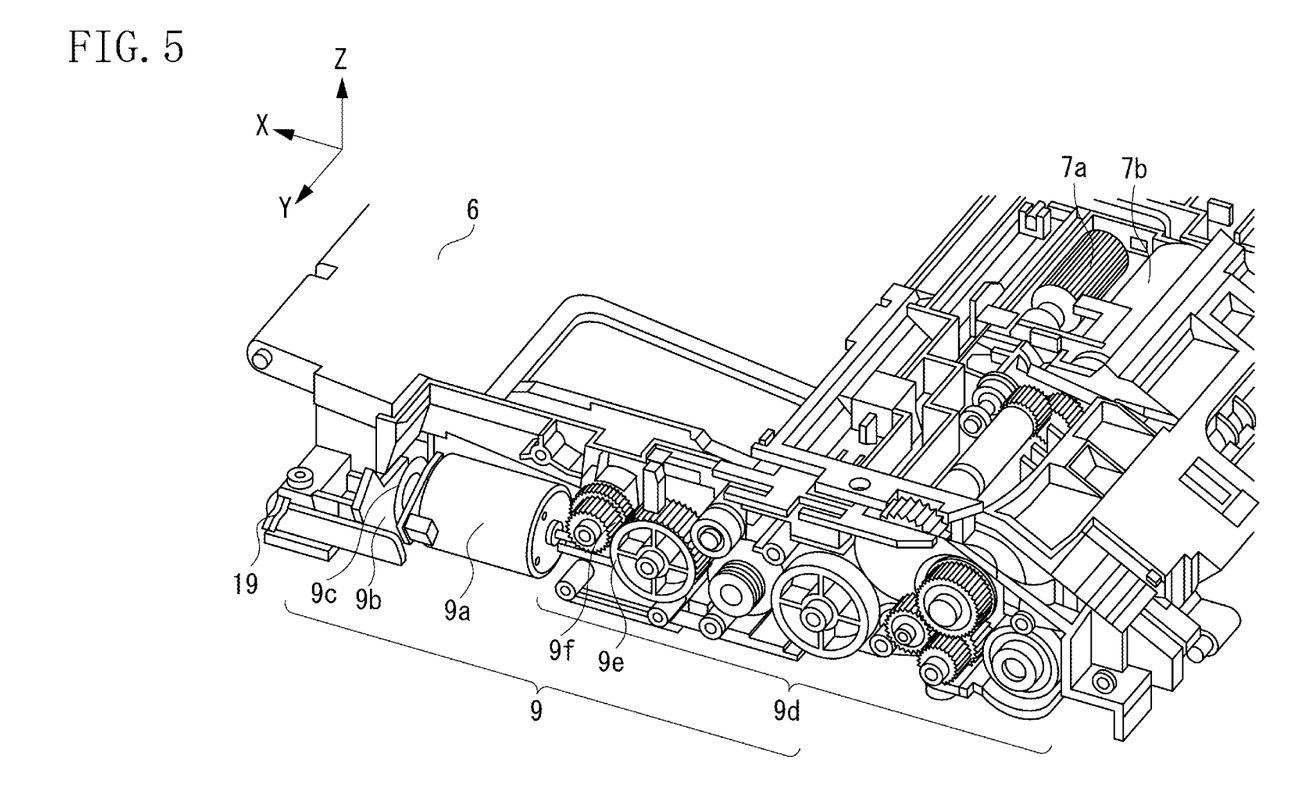
FIG. 5 is a perspective view illustrating a detailed structure of essential components in FIG. 4.
Figure 6:
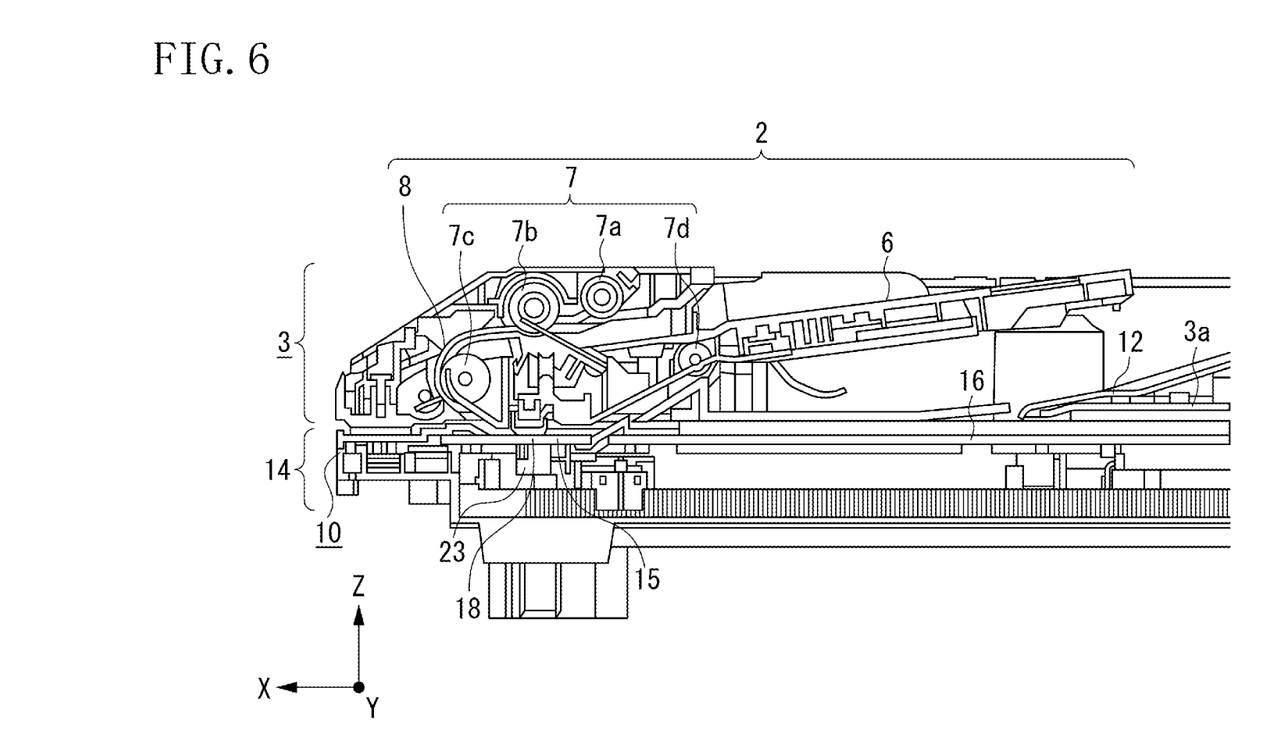
FIG. 6 is a cross-sectional view illustrating the structure of the ADF.

Hereinbelow, the details of the feeding unit 2 included in the ADF 3 will be described as one of the features of the exemplary embodiment of the present invention. FIG. 4 is a perspective view illustrating a structure of the feeding unit 2. FIG. 5 is a perspective view illustrating a structure of the gear trains in FIG. 4. FIG. 6 is a cross-sectional view of the feeding unit 2.

The feeding unit 2, which is an essential component of the ADF 3, broadly includes a sheet feed tray 6, a roller group 7 that moves the documents one by one, a motor 9a, a transmission gear train 9d that transmits rotation of the rotational shaft of the motor 9a to the roller group 7, and an encoder unit that detects rotation information of the motor 9. The motor 9a includes a DC motor. The encoder unit includes an encoder sensor 9b and a code wheel 9c. A drive unit 9 includes the motor 9a, the encoder sensor 9b, the code wheel 9c, and the transmission gear train 9d.

Between the hinges 4a and 4b provided at two locations, in the direction (the X direction) of the rotational axes of the hinges 4a and 4b, at least a part of the transmission gear train 9d, the motor 9a, and the code wheel 9c, which constitute the drive unit 9, are arranged in series.

On the top of the feeding unit 2, there is provided the sheet feed tray 6 capable of stacking a plurality of documents. The roller group 7 includes a plurality of rollers for conveying the documents one by one stacked on the sheet feed tray 6. A path 8, through which the documents are conveyed, is turned back in a U-turn pattern on the halfway to reverse the travelling direction of the sheet.

The roller group 7 includes four rollers: a pickup roller 7a, a separation roller 7b, a conveyance roller 7c, and a discharge roller 7d. The pickup roller 7a picks up an uppermost one of a plurality of documents stacked on the sheet feed tray 6. The separation roller 7b surely separates the sheet of the picked up document from the underlying document. The conveyance roller 7c is provided halfway on the path 8, and moves the sheet relative to the line sensor 23 while the document is read. The discharge roller 7d discharges the read document to the discharge tray 12.

On the side (the rear side) of the hinge 4 of the feeding unit 2, there are arranged the motor 9a serving as a driving source, and the transmission gear train 9d that transmits decelerated rotation of the motor 9a to the respective rollers of the roller group 7. A body of the motor 9a has a vertically long cylinder, which is longer in a direction (the X direction) of the rotational shaft than in a radial direction (the Y direction and Z direction). The rotational shaft (an output shaft) of the motor 9a has both sides (a head side and tail side) protruding long relative to the body of the motor 9a. The orientation of the rotational shaft is parallel with the rotational axes of the hinges 4a and 4b (the term "parallel" used herein has a meaning that includes not only definitely parallel but also substantially parallel). Further, directions of rotational axes of respective rollers that constitute the roller group 7 are in the Y direction, and intersect with the direction of the rotational shaft (both directions are orthogonal with each other in the present exemplary embodiment, but may not necessarily be orthogonal).

At one end portion (the head side, referred to as a first end portion) of the rotational shaft on the transmission gear train 9d side, there is attached a worm gear 9e, which is a part of the transmission gear train 9d. The transmission gear train 9d includes a plurality of gears including a gear 9f engaged with the worm gear 9e, and rotation of the motor 9a is transmitted to each gear. The transmission gear train 9d includes gears attached at respective end portions of rotational axes of the pickup roller 7a, the separation roller 7b, the conveyance roller 7c, and the discharge roller 7d, and a plurality of idler gears for drive transmission among these gears. When viewed from above (the Z direction), the transmission gear train 9d is arrayed generally in a direction of an extension of the rotational shaft. Further, when viewed from side (the Y direction), the transmission gear train 9d is also arrayed generally in a direction of an extension of the rotational shaft. The rotational shaft may have some inclination relative to array formation direction of the transmission gear train 9d.

On the other hand, at the other end portion (the tail side, referred to as a second end portion) of the rotational shaft on the opposite side to the worm gear 9e side, there is attached the code wheel 9c of the encoder unit for detecting a rotation state (a rotation amount or rotation speed) of the motor 9a. Furthermore, there is provided the encoder sensor 9b having a photo interrupter for optically detecting slit patterns formed circumferentially on the code wheel 9c.

In this way, at one end portion (the first end portion) side of the rotational shaft of the motor 9a, there is attached the worm gear 9e that forms a part of the transmission gear train 9d. At the other end portion (the second end portion) side of the rotational shaft, there is attached the code wheel 9c. Following this, the encoder sensor 9b is also arranged at the second end portion side. In other words, the code wheel 9c, the motor 9a, and the gears that constitute the transmission gear train 9d, which together constitute the drive unit 9, are arranged side by side substantially in a line. As a result, that realizes high space efficiency.

Along with rotation of the motor 9a, the code wheel 9c coaxially arranged on the rotational shaft is also rotated, and the encoder sensor 9b outputs a pulse signal in response to passage of the slit. By counting a number of pulses, the motor rotation state (the rotation amount or rotation speed) can be detected. According to the detection result, the control unit controls rotation of the motor 9a so that a predetermined speed or a predetermined amount of document feed can be attained.

Hereinbelow, an operation when the ADF 3 reads a document by sheet-through will be described. Basically, the feeding unit 2 separates and conveys the documents one by one, allows the document to pass a reading position 18 of the reading window 15 at a predetermined speed, and discharges the read documents one by one to the discharge tray 12.

The user first sets a sheet or a plurality of sheets of documents on the sheet feed tray 6, and presses a scan start button provided on the operation panel 13. A sensor that detects the set documents on the sheet feed tray 6 is provided. When the sensor has detected presence of the documents, the control unit starts driving to rotate the motor 9a. Along with rotation of the motor 9a, rotation is transmitted to the gears included in the transmission gear train 9d, that is, from the worm gear 9e to the gear 9f, and further to the gear train followed by. In this way, the pickup roller 7a, the separation roller 7b, the conveyance roller 7c, and the discharge roller 7d, which form the roller group 7, rotate in unison.

First, the pickup roller 7a presses an uppermost one of the stacked documents, and picks up the documents by rotation of the pickup roller 7a. The picked up documents are separated one by one by a frictional force induced between the separation roller 7b and the separation pad opposite the separation roller 7b. Along the path 8, the conveyance roller 7c conveys the document at a predetermined speed. In a state where reading surface (a front surface) of the document faces toward the side of the reading window 15, reading of an image is performed while scanning the document at a predetermined speed with respect to a line sensor unit 23. Then, the discharge roller 7d discharges the read document onto the discharge tray 12.

Advantages of the reading apparatus 1 according to the present exemplary embodiment will be described. According to the present exemplary embodiment, the orientation of the rotational shaft of the motor 9a is parallel with the rotational axes of the hinges 4a and 4b, and the transmission gear train 9d is arrayed in the direction of the extension of the rotational shaft. That is, between the hinges 4a and 4b provided at two locations in a direction of the rotational axes thereof, the drive unit 9 including at least a part of the transmission gear train 9d, the motor 9a, and the encoder unit is arranged in the X direction in a highly integrated manner in a small space. Consequently, a dead space on a rear side of the apparatus 1 in the Y direction is small and space efficiency is high. In particular, a rear direction of the apparatus can be downsized.

Further, in the drive unit 9, the worm gear 9e and the code wheel 9c are attached separately to the rotational shaft on the respective sides of the motor body, so that a length of the rotational shaft part, which protrudes from the motor body, can be made short. Consequently, inclination or bend of the rotational shaft is less likely to occur and positional deviation of the code wheel 9c is less likely to occur. In addition, since the motor body is located therebetween, grease for lubrication of the worm gear 9e is less likely to adhere to the code wheel 9c or the encoder sensor 9b. Accordingly, high detection accuracy of the encoder can be maintained for a long period of time.

In the feeding unit 2, the one which may become a heat generating source is a body of the motor 9a. In particular, when the feeding unit 2 continuously conveys a plurality of sheets of the documents, a temperature of the motor 9a rises sharply. In the present exemplary embodiment, the motor 9a is arranged near the center of the space between the hinge 4a and the hinge 4b, and the drive gear train and the encoder unit are arranged separately on the respective sides of the motor body. As a result, the gear or the encoder never comes close to the motor body, which becomes highly heated. Therefore, change of engagement of the gears resulting from expansion of gears due to heat, or change in characteristics of a light source or light-receiving elements of the encoder due to heat is inhibited. If a hole for exhaust heat is opened in the exterior cover arranged above the motor 9a, heat of the motor 9a is effectively discharged from the space, and, as a result, temperature rise can be further inhibited.

Further, electric cables 19 of the motor 9a and the encoder sensor 9b are wired without passing through the side of the gear train 9d, and connected to the control unit. Consequently, there is no possibility that the cables 19 touch the gears 9d, even if a position of electric cables 19 is deviated by shock or vibration, so that highly integrated and small in size, but highly reliable apparatus can be provided.

In this way, according to the present exemplary embodiment, compatibility between reduction in size of the reading apparatus and document reading with a high accuracy can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-018919 filed Jan. 31, 2012, which is hereby incorporated by reference herein in its entirety.

What is claimed is:

1. A reading apparatus comprising:
   a base unit including an image sensor for reading a document; and
   an auto document feeder configured to be openable and closable around a hinge, provided at each of two locations, with respect to the base unit,
   wherein the auto document feeder includes:
   a roller configured to move the document relative to the image sensor;
   a motor;
   a gear train configured to transmit a rotation of a rotational shaft of the motor to the roller; and
   an encoder unit configured to detect a rotation information of the motor, and include an encode sensor and a code wheel,
   wherein an orientation of the rotational shaft is parallel to a rotational axis of the hinge, and the gear train is arrayed in a direction of an extension of the rotational shaft,
   wherein at least a part of the gear train, the motor, the encoder unit and a hole, the encoder sensor and a substrate provided inside the base unit being electrically connected to each other by an electric cable wired through the hole, are arranged in order between the two locations in a direction of the rotational axis of the hinge, and wherein a longitudinal direction of the hole is along with the rotational axis of the hinge.

2. The reading apparatus according to claim 1, wherein a direction of a rotational axis of the roller intersects with a direction of the rotational shaft.

3. The reading apparatus according to claim 1, wherein the roller includes at least one of: a roller that picks up documents on a sheet feed tray, a roller that separates documents one by one, a roller that conveys documents while reading is performed, and a roller that discharges read documents.

4. The reading apparatus according to claim 1, wherein an operation panel is provided on a top surface of the auto document feeder on an end portion side opposite the hinge.

5. The reading apparatus according to claim 1, wherein the base unit includes a flatbed scanner unit, and wherein the flatbed scanner unit includes a glass plate on which the document is to be placed, and a carriage that moves the image sensor relative to the document on the glass plate.

6. The reading apparatus according to claim 5, further comprising a printing unit configured to print an image of the read document.

7. A reading apparatus comprising:
   a unit including an image sensor for reading a document;
   an operation panel provided on a top surface of an auto document feeder on an end portion side opposite a hinge; and
   the auto document feeder configured to be openable and closable around the hinge with respect to the unit,
   wherein the auto document feeder includes:
   a roller configured to move the document relative to the image sensor;
   a motor;
   a gear train configured to transmit a rotation of a rotational shaft of the motor to the roller; and
   an encoder unit configured to detect rotation information of the motor, and including a sensor and a code wheel,
   wherein an orientation of the rotational shaft is parallel to a rotational axis of the hinge, and the gear train is arrayed in a direction of an extension of the rotational shaft, and
   wherein a gear that is a part of the gear train is attached to one end of the rotational shaft, and the code wheel is attached to the other end of the rotational shaft.

8. The reading apparatus according to claim 7, wherein a direction of a rotational axis of the roller intersects with a direction of the rotational shaft.

9. The reading apparatus according to claim 7, wherein the roller includes at least one of: a roller that picks up documents on a sheet feed tray, a roller that separates documents one by one, a roller that conveys documents while reading is performed, and a roller that discharges read documents.

10. The reading apparatus according to claim 7, wherein the unit includes a flatbed scanner unit, and wherein the flatbed scanner unit includes a glass plate on which the document is to be placed, and a carriage that moves the image sensor relative to the document on the glass plate.

11. The reading apparatus according to claim 10, further comprising a printing unit configured to print an image of the read document.

* * * * *